Patented July 22, 1924.

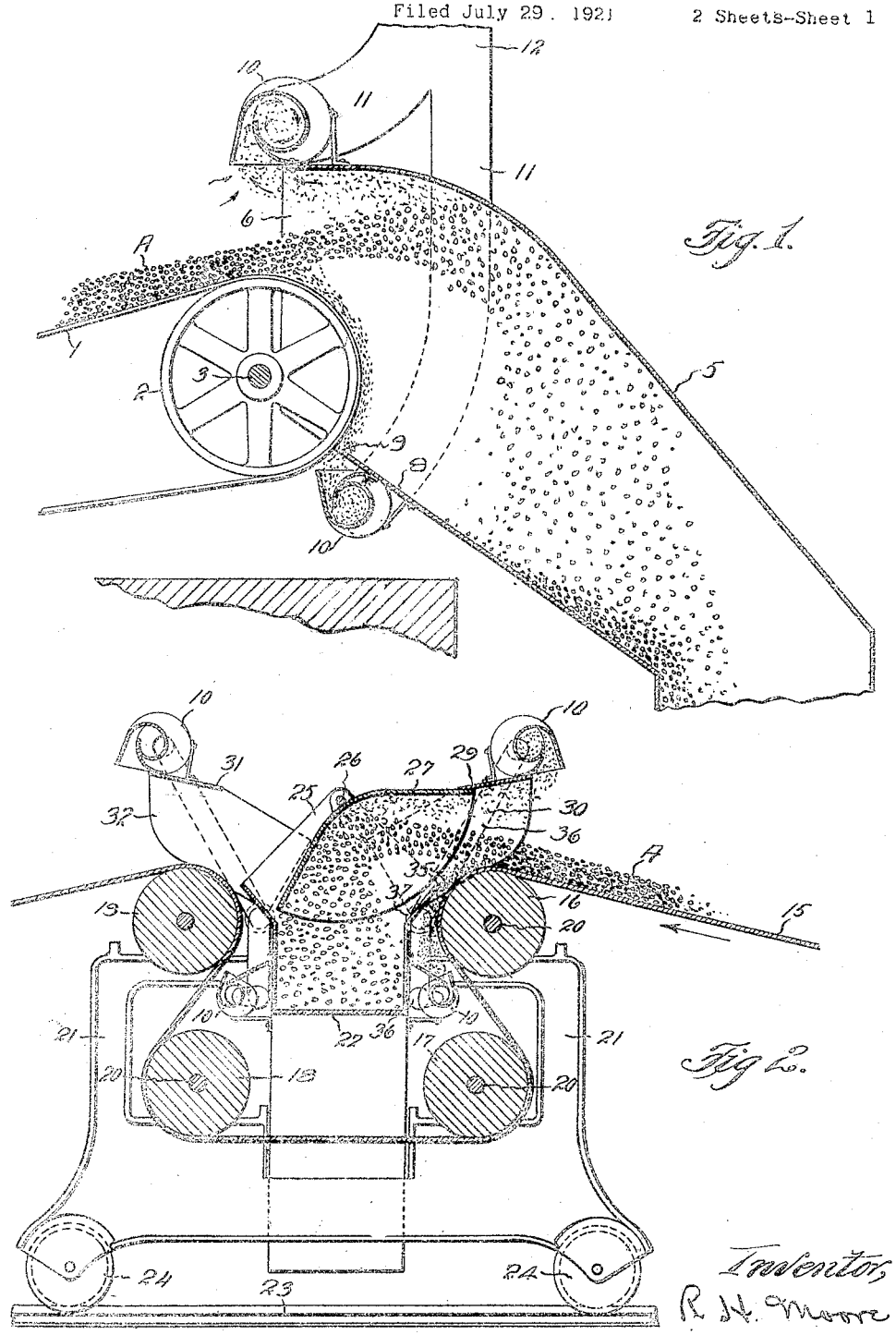

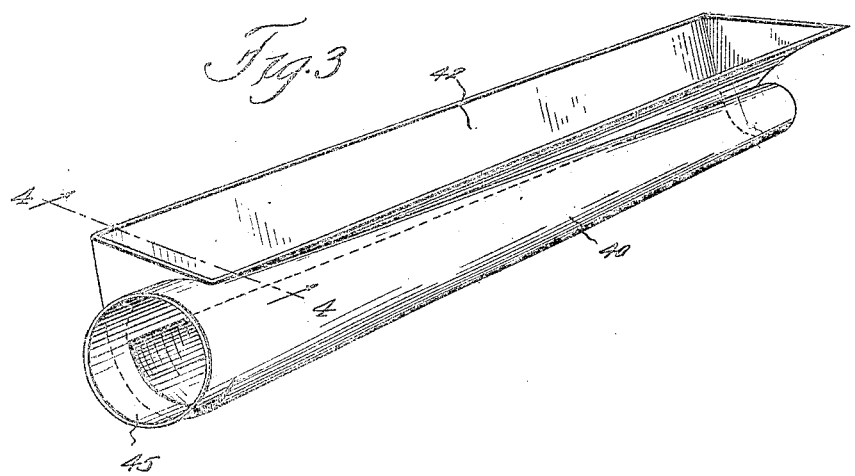
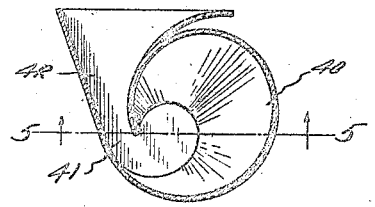
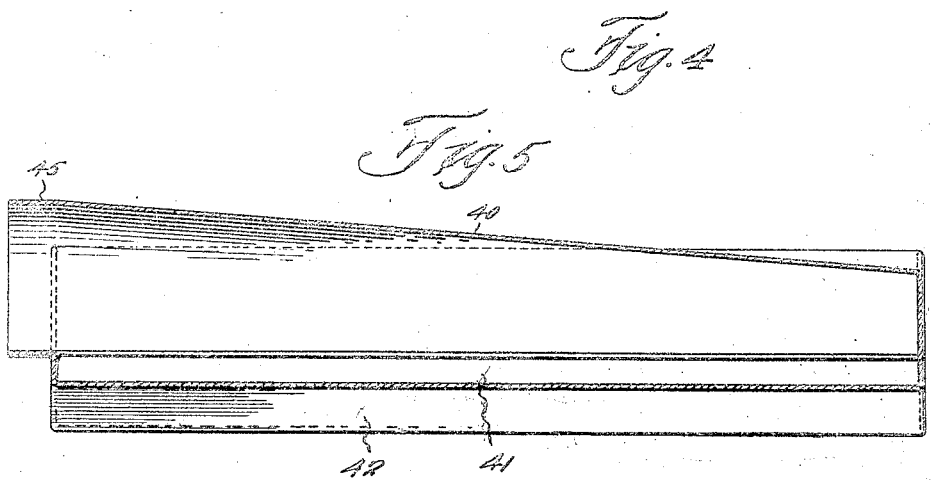

1,502,050

UNITED STATES PATENT OFFICE.

RAYMOND H. MOORE, OF CHICAGO, ILLINOIS.

VENTILATING MEANS FOR THE RECEIVERS OF BELT CONVEYERS.

Application filed July 29, 1921. Serial No. 488,381.

*To all whom it may concern:*

Be it known that I, RAYMOND H. MOORE, a citizen of the United States, residing at Chicago, in the county of Cook and State of Illinois, have invented a certain new and useful Improvement in Ventilating Means for the Receivers of Belt Conveyers, of which the following is a full, clear, and exact description, reference being had to the accompanying drawings.

This invention relates to ventilating apparatus that is particularly adapted for use with belt conveyers for arresting and carrying off the dust that is thrown in suspension where the belt discharges its load into a receiver. A very important instance of its use is the ventilating of discharge boots and trippers of belt conveyers in grain elevators, the present embodiment being designed for such use and accordingly illustrated herein in such connection.

Much danger of explosions and fires caused by artificial means or spontaneous combustion arises from the accumulation of dust and chaff about the discharge boots and trippers of belt conveyers used for transporting grain in elevators, and considerable expense is incurred in cleaning up the refuse where it is thrown off in the vicinity of the aforesaid apparatus and where it rolls up and clogs beneath the return branch of the belt. The need of ventilating means in this connection has been very keenly felt in the past, but it offered a problem difficult of solution inasmuch as the ordinary suction apparatus, such as is used in shops and mills for disposing of the dust and dirt, was not applicable to the present situation. The suction hoods employed in the former apparatus were quite unfitted to the restricted space wherein the hoods have to be placed in connection with the discharge boots and trippers of belt conveyers and the suction produced by these hoods would attract not only the chaff and dust, but considerable of the grain, or other commodity being transported by the belt, as well.

The objects of my invention are to provide ventilating means peculiarly adapted for use with the discharge boots and trippers of belt conveyers; to provide ventilating means incorporating hoods that are compact enough to be readily accommodated by the restricted space wherein they are required to be situated and yet which are of ample capacity to take care of all of the dust and chaff that is thrown off by the conveyer; to provide ventilating hoods of the aforesaid character which are so designed as to attract the chaff and dust without exerting any influence over the grain or other commodity being handled by the belt; to provide a ventilating hood so designed as to cause a free and uniform flow of the air and its content therethrough, to the end that no retardation or "choke" in the flow is created; to provide a ventilating hood through which the air is drawn with a swirling action, causing the dust and chaff to be held in suspension thereby preventing clogging; and to provide ventilating means of the aforesaid character which is comparatively simple and inexpensive of production and is especially convenient of installation in existing types of discharge boots and trippers.

To the attainment of the foregoing objects, and others which will become apparent as this description proceeds, my invention may be defined as consisting of the combination and arrangement of parts set forth in the claims annexed hereto and illustrated in the drawings accompanying and forming a part hereof and wherein Fig. 1 is a more or less diagrammatic representation in sectional side elevation of the discharge boot of a belt conveyer equipped with the ventilating means of my invention; Fig. 2 is a similar view of a reversible tripper having applied to it two units of my improved ventilating means; Fig. 3 is a perspective view of one of the hoods; Fig. 4 is a transverse section through the hood in a plane indicated by the line 4—4 of Fig. 3; and Fig. 5 is a longitudinal section through the hood on the correspondingly numbered line of Fig. 4 and looking in the direction indicated by the arrows associated with said line.

In Fig. 1 a belt conveyer 1 is shown as guided over a pulley 2 that is supported upon a shaft 3 within the receiving end of a discharge boot 5 that may lead to the tank or pit of a bucket elevator (not shown). The top and side walls of the boot define the mouth 6 thereof through which the material A is discharged, and the upper edge of the bottom wall 8 of the boot is spaced a slight distance from the belt where the latter passes beneath the pulley, leaving an opening 9.

In the usual operation of this apparatus, the heavier particles of material (such as the grains in the case of wheat) are thrown off in the manner illustrated in Fig. 1, the weight of the particles or the grains causing them to continue in the general direction in which they have been travelling with the belt until, through gravity or their contact with the top wall of the boot, they are deflected downwardly. A very considerable amount of dust is thrown in suspension as the material leaves the belt, and as nearly as I have been able to estimate, about 60% of the dust thrown off rolls back and escapes through the mouth of the boot, while approximately 40% descends in proximity to the belt where it passes about the pulley, some of it gravitating through the boot, and the remainder escaping through the opening 9. I also find that practically all the chaff, in the handling of such commodities as wheat, cleaves to or follows closely the belt as it passes over the descending side of the pulley and escapes through the opening 9. Consequently, without means to arrest the dust in the mouth of the boot and the chaff and dust as they escape through the opening 9, the same accumulate about the booth and beneath the return branch of the belt conveyer with the attendant difficulties and annoyances above related.

According to my invention, I situate above the mouth of the boot, and beneath the opening 9 thereof, respectively, one of my special hoods 10, and these hoods have communicative connection, through branch ducts 11, with a suction conduit 12. The character and construction of the hoods 10 will be described hereinafter in detail.

In Fig. 2 I have shown, in vertical section, without going into structural details further than is necessary to properly illustrate the association therewith of my invention, a reversible tripper of a belt conveyer, the belt being designated 15 and shown as guided over rollers 16, 17, 18 and 19 that are supported upon shafts 20. As is well known to those familiar with the subject at hand, trippers of this character involve a branched chute designated 22 which is adapted to discharge its load on opposite sides of a track 23 on which the tripper is mounted through wheels 24. Between the upwardly extending side walls 25 of the branched chute 22 is pivotally supported, as upon a shaft 26 that may be supported by and between said walls, a bonnet 27. This bonnet is adapted to be swung from a position at one side, where it cooperates with a wall section 29 to provide a receiving mouth 30, to a corresponding position on the other side, where it is adapted to cooperate with a wall section 31 that defines a receiving mouth 32, the position of the bonnet 27 depending, of course, upon the direction in which the belt 15 is travelling. In the present instance, with the belt travelling in the direction indicated by the arrow and the bonnet in the position illustrated, there is a condition quite similar to that above described in connection with the apparatus of Fig. 1, the material A, in the present case, being projected into the bonnet 27 in the general direction in which it has been travelling with the belt until it is deflected downwardly by the bonnet, or drops by gravity, into the discharge branches of the chute 22. The greater part of the dust in this case, as in the former, escapes through the mouth 30, while the remainder thereof and the chaff continue with the belt and escape through an opening 35 between the belt and the adjacent wall of the chute. To recover this dust and chaff and the dust which escapes from the mouth 30, I locate a ventilating hood 10 in each of the respective positions. Another pair of hoods are correspondingly situated on the other side of the tripper, for use when the belt is running in the opposite direction. The corresponding ends of both hoods of each pair are communicatively connected, through branch conduits 36, with a suitable header 37 that is adapted to have connection, through a portable hose or the like, with inlets of a stationary suction system (not shown).

It will be understood that the tripper is shiftable along the track 23 over bins into which the material is to be dumped, and inlets of the stationary suction system are arranged for connection with the headers 37 of the tripper when it occupies any of its various positions.

Turning now to my improved ventilating hood, illustrated in detail in Figs. 3 to 5 and designated 10 in all views of the drawing, the same comprises a substantially frusto-conical casing 40 that is approximately spiral in cross section, as shown particularly in Fig. 4, and this casing is provided with an inlet opening 41 along one side which, in the present instance, is illustrated as of the same width throughout its length. The opening registers with the inner end of a receiving nozzle 42 that gradually increases in area toward its outer end. The larger end of the casing 40 is provided with an outlet extension or collar 45 for connection with the suction duct. By reason of its shape, this ventilating hood is exceedingly efficient and peculiarly adapted for the purpose intended, as it has a comparatively large capacity, will not clog, and causes no retarding effect upon the flow of air therethrough. Because of the fact that the volume or capacity of the casing 40 increases gradually toward the outlet end, a substantially uniform suction is created throughout the entire length of the receiving nozzle; and the air, entering at a tangent to the casing produces a decided swirling action which maintains the dust and chaff in suspension and produces a siphon action within the nozzle, wherefore there is no liability of either the casing or nozzle becoming clogged. Furthermore the peculiar shape and the compactness of the hood adapt it to the restricted space wherein it is necessary to locate the hood in connection with discharge boots and trippers of belt conveyers.

Having thus described my invention, what I claim is:

1. In combination with a belt conveyer, a receiver into which the belt discharges its load, and a suction hood situated adjacent to the return side of said belt and beneath the mouth of the receiver, said hood being adapted to have communicative connection with a suction system.

2. In combination with a belt conveyer, a receiver into which the belt discharges its load, and a pair of suction hoods situated adjacent the mouth of the receiver, one above and one below the plane at which the load is discharged, said hoods being adapted to have communicative connection with a suction system.

3. The combination with a belt conveyer, a receiver into which the belt discharges its load, and a suction hood situated outwardly beyond the lower side of the mouth of the receiver, said hood being adapted to receive the refuse retained by said belt after the load is discharged, said hood being adapted to have communicative connection with a suction system.

4. In combination with a belt conveyer, a receiver into which the belt discharges its load, and a pair of suction hoods, one situated outwardly beyond each the top and the bottom sides of the mouth of the receiver, the upper of said hoods being adapted to receive the refuse discharged with said load, the lower of said hoods being adapted to receive the refuse retained by said belt after the load is discharged, said hoods being adapted to have communicative connection with a suction system.

5. In combination with a receiver of the character set forth, a pulley supported adjacent the mouth of the receiver, a conveyer belt guided over the pulley so as to discharge its load into the receiver, a suction hood supported above the receiver with its receiving nozzle adjacent the mouth of the receiver, said hood being adapted to receive the refuse discharged with the load, and a second ventilating hood disposed in proximity to the underside of the pulley in a position to receive refuse retained by said belt after the load is discharged and refuse escaping from the underside of the receiver, said hoods being adapted to have communicative connection with a suction system.

6. In combination with a belt conveyer, a tripper therefor involving pulleys over which the belt is guided to provide a downwardly directed portion, the tripper having a chute the mouth whereof is in such position as to receive the load from the belt, and suction hoods disposed in operative relation to the mouth of the chute, said hoods being adapted to have communicative connection with a suction system.

7. In combination with a belt conveyer, a tripper therefor involving a chute into which the belt discharges its load, and a suction hood disposed in operative relation to the mouth of the chute, said hood being adapted to have communicative connection with a suction system.

8. In combination with a belt conveyer, a tripper therefor involving guides over which a portion of the belt is directed downwardly thereby to cause it to discharge its load regardless of which direction the belt is traveling, the tripper having also a chute into which the load is discharged, a reversible bonnet supported in operative relation to the upper end of the chute for deflecting the load into the chute when the belt is traveling in either direction, and suction hoods, one supported on each side of the tripper for use respectively when the bonnet is in either of its positions, said hoods being adapted to have communicative connection with a suction system.

9. In combination with a belt conveyer, a reversible tripper therefor, the tripper having guides over which the belt is directed to cause it to discharge its load regardless of the direction in which the belt is traveling, the tripper having also a chute into which the load is discharged, a reversible bonnet supported in operative relation to the upper end of the chute for deflecting the load into the chute when the belt is traveling in either direction, and two pairs of suction hoods carried by the tripper, one pair on each side thereof, one of the hoods of each pair being situated above the plane of the belt and in operative relation to the receiving mouth of the chute, and the other hood of each pair being situated below and in operative relation to the receiving mouth of the chute below the plane of the discharge load, the pairs of suction hoods being adapted to have communicative connection with a suction system.

10. A ventilating hood comprising an elongated casing enclosing a chamber that is substantially spiral in cross section and the capacity whereof gradually increases from one end to the other, the casing having an inlet opening along one side, and a nozzle communicating with the inlet opening, the casing having an outlet opening at the larger end of the chamber.

11. A ventilating hood comprising a substantially frusto-conical casing that is approximately spiral in cross section, the casing having an inlet opening throughout its length and the sides of which opening are defined by the radially spaced edges of the spiral casing, and a nozzle communicating with the inlet opening and the area of whose passageway gradually increases outwardly, the casing having an outlet opening at its larger end.

12. A ventilating hood comprising a substantially frusto-conical casing that is approximately spiral in cross section, the casing having an inlet opening throughout its length and the sides of which opening are defined by the radially spaced edges of the spiral casing, and a nozzle communicating with the inlet opening, the casing having an outlet opening at its larger end.

In testimony whereof, I hereunto affix my signature.

RAYMOND H. MOORE.